UNITED STATES PATENT OFFICE.

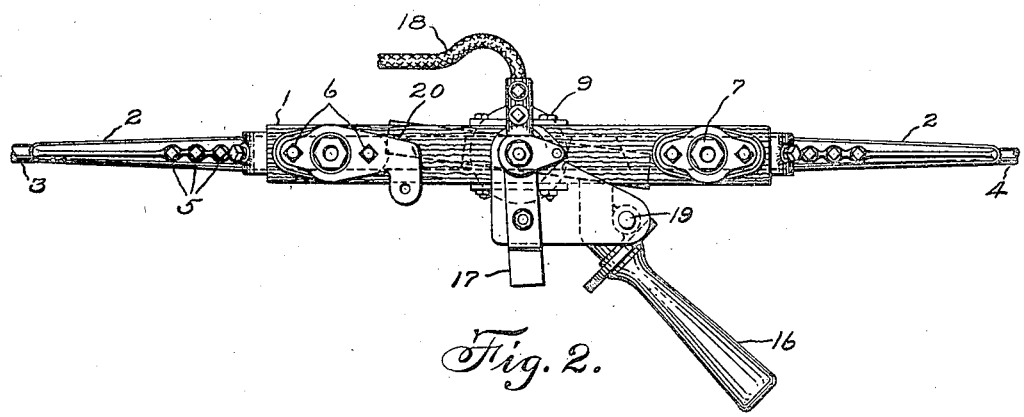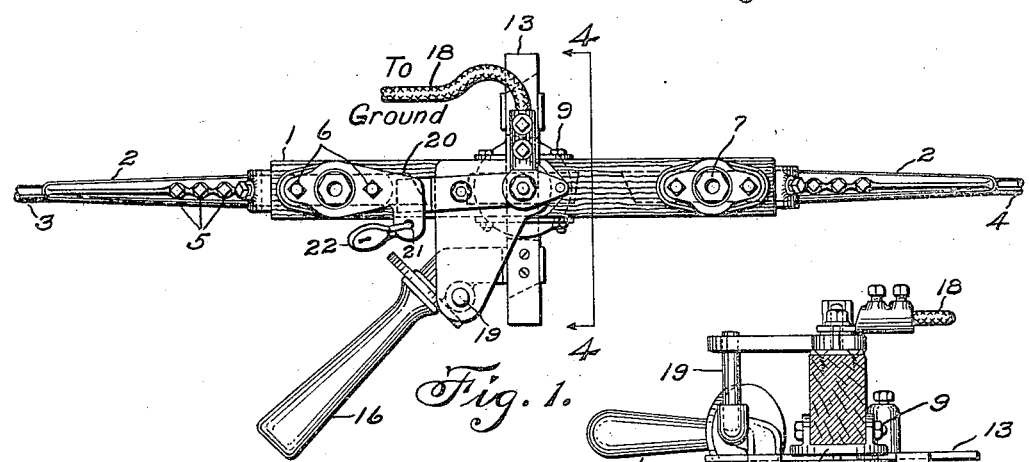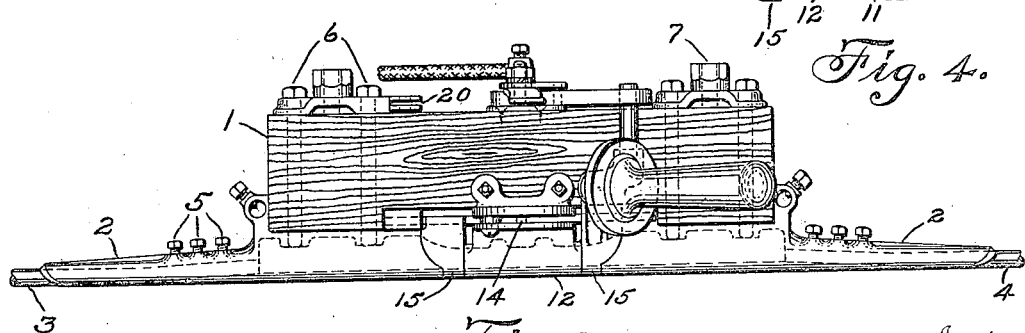

SAMUEL S. MATTHES, OF MANSFIELD, OHIO, ASSIGNOR TO THE OHIO BRASS COMPANY, OF MANSFIELD, OHIO, A CORPORATION OF NEW JERSEY.

SECTIONAL INSULATOR.

1,410,700. Specification of Letters Patent. Patented Mar. 28, 1922.

Application filed December 8, 1921. Serial No. 520,873.

*To all whom it may concern:*

Be it known that I, SAMUEL S. MATTHES, a citizen of the United States of America, residing at Mansfield, in the county of Richland and State of Ohio, have invented certain new and useful Improvements in Sectional Insulators, of which the following is a specification.

My invention relates to section insulators and more particularly to section insulators for trolley wires used in mines. The laws of many States require when the trolley wire is sectionalized that the dead section shall be grounded and the section insulators shall provide means for grounding such section when the insulator switch is open.

My device provides for holding the ends of the trolley wire in spaced and insulated relation and means for connecting or disconnecting the sections of trolley wire and for grounding the section away from the source of supply when the sections are disconnected from each other.

My invention resides in the construction, combination and relation of the various parts as herein disclosed and described.

In the accompanying drawings:

Fig. 1 is a top plan view of my invention showing the trolley sections disconnected and one section grounded.

Fig. 2 is a top plan view of my invention showing the trolley sections connected and the ground connection broken.

Fig. 3 is a side view in elevation corresponding to Fig. 2.

Fig. 4 is a section on line 4—4 of Fig. 1.

In my preferred form I employ an insulating member 1 of wood fibre, etc., to the ends of which are secured spaced terminal members 2 for receiving and holding the terminals of the trolley conductors 3 and 4. The set screws 5 hold the conductors in place and the bolts 6 hold the terminal members to the member 1. The whole device is supported from the mine roof by the members 7.

Secured to member 1 midway between the inner ends of the members 2 is a circular plate 8, held in place by the bolts 9. Spaced from the plate 8 and held in place below by the screws 10 is a circular plate 11 having an integrally formed runner 12 which is spaced from the inner ends of the members 2 thereby leaving a space between the members 2 and member 12 when the switch mechanism is open.

Between the members 8 and 11 is pivoted a switch blade 13 arranged to rotate in a horizontal plane about a central bearing 14. When the blade 13 is rotated to closed position the ends of the blade engage with the inner ends of the members 2 thereby electrically connecting the same. Secured to the under side of the blade 13 near each end is a bridging member 15 arranged to close the gap between the members 2 and 12 when the switch is closed and thereby offer a smooth under-run for the current collector or trolley wheel. An insulated handle 16 is secured to the blade for hand operation of the blade.

Secured to the upper edge of the member 1 is a blade 17 having electrically connected therewith a cable 18 arranged to connect to the ground. The blade 17 and blade 13 are mechanically connected together by the insulating member 19, such that the two blades are insulated from each other but will pivot simultaneously. The blade 17 is arranged to engage one of the members 2 through the lug 20, which is connected to the members 2 by the bolts 6, the blade 13 is disconnected from the members 2 and thereby ground the one terminal member. The lug 20 has a hole 21 into which a pin or padlock 22 may be inserted to lock the switch against being opened or closed.

The operation of my invention will be readily understood as such operation is very simple. When a car approaches the insulator from the direction of the source of supply and the switch is open, the car operator will close the switch 13 by means of the handle 16 thereby removing the ground from the section he is about to enter and making alive said section and bridging the gap in the under face of the device to give the collector a smooth uninterrupted surface to travel upon. In returning in the opposite direction he throws the switch 13 into the open position after he has passed the insulator thereby rendering dead the section first left and grounding the same thereby making it safe to any one coming in contact therewith.

If for any reason it is desired to work upon a section and to render the section safe against being made alive, the workman is provided with a padlock which he can insert in the hole 21 after the switch has been opened and the section grounded, thereby preventing the car operator or others from closing the switch and making the section alive while men are working thereon.

Modification will be apparent to those skilled in the art but which will come within the scope of my invention, but what I wish to cover is set forth in the following claims:—

1. A sectional insulator for engaging and maintaining the adjacent terminals of trolley wires separated and insulated a fixed distance apart and having in combination therewith means to electrically connect or disconnect the trolley wire terminals and means to ground one terminal when the terminals are disconnected.

2. A sectional insulator arranged to electrically connect or disconnect the terminals of adjacent trolley wires and to ground one wire when the terminals are disconnected, comprising in combination an insulating member, terminal means at each end to receive a trolley wire, means to electrically connect or disconnect the terminal means and means to ground one of the terminal means when the terminal means are electrically disconnected.

3. A sectional insulator comprising in combination an insulating member having means to receive the adjacent terminals of trolley wires and maintain them a fixed distance apart, means to electrically connect or disconnect one of the trolley conductors with the ground and means to electrically connect or disconnect the trolley wires.

4. A section insulator comprising in combination an insulating member having means to receive the adjacent terminals of trolley wires and maintain them a fixed distance apart, means to electrically connect or disconnect one of the trolley conductors with the ground and means to electrically connect the trolley wires when one of the trolley wires is disconnected from the ground.

5. A section insulator comprising in combination an insulating member having means to receive the adjacent terminals of trolley wires and maintain them a fixed distance apart, means to electrically connect or disconnect one of the trolley conductors with the ground and means to electrically disconnect the trolley wire when one of the trolley wires is grounded.

6. A trolley device comprising an interrupted conductor, insulating means for holding the terminals of the conductor a fixed distance apart, means for guiding the trolley across the break and simultaneously electrically connecting the terminals and simultaneously operated means to disconnect one of the terminals from an electrical ground when the terminals are electrically connected.

7. A trolley device comprising an interrupted conductor, insulating means for holding the terminals of the conductor a fixed distance apart, means to connect or disconnect one terminal with the ground, means to electrically connect or disconnect the conductor terminals and means connecting the last two named means to cause them to operate simultaneously to connect one conductor to ground when the conductors are electrically disconnected, and vice versa.

8. A trolley device comprising an interrupted conductor, insulating means for holding the terminals of the conductor a fixed distance apart, and means to connect one conductor terminal with the ground when the conductor terminals are disconnected from each other and to disconnect one conductor terminal from the ground when the conductor terminals are electrically connected with each other.

9. A trolley device comprising an interrupted conductor, insulating means for holding the terminals of the conductor a fixed distance apart, means for electrically connecting or disconnecting the conductor terminals and means to ground one conductor terminal when the conductor terminals are disconnected.

10. A trolley wire device comprising an interrupted conductor, insulating means for holding the terminals of the conductor a fixed distance apart and means to electrically connect or disconnect one of the terminals with the ground.

11. A trolley device comprising an interrupted conductor, insulating means for holding the terminals of the conductor a fixed distance apart, means for electrically connecting or disconnecting the conductor terminals, and means to ground one of the conductors after the disconnection of the conductor terminals has been made.

12. A trolley device comprising an interrupted conductor, insulating means for holding the terminals of the conductor a fixed distance apart, means for electrically connecting or disconnecting the conductor terminals, means to ground one of the conductors and means to operate said ground means to disconnect said ground prior to electrically connecting the conductor terminals.

13. A trolley device comprising an interrupted conductor, insulating means for holding the terminals of the conductor a fixed distance apart, rotatably mounted means for electrically connecting or disconnecting the conductor terminals, rotatably mounted means to connect or disconnect one of the conductors with ground, a ground lead connected to the last said means and means connecting the two rotating means for simultaneous operation.

14. A trolley device comprising an interrupted conductor, insulating means for holding the terminals of the conductor a fixed distance apart, rotatably mounted means for electrically connecting or disconnecting the conductor terminals, and means to connect or disconnect one of the conductors with the ground.

15. A trolley device comprising an interrupted conductor, insulating means for holding the terminals of the conductor a fixed distance apart, means for electrically connecting or disconnecting the conductor terminals, grounded means insulated from the above connecting means arranged to connect or disconnect one of the terminals with ground, and means connecting the grounded means and connecting means for simultaneous operation.

16. A trolley device comprising an interrupted conductor, insulating means for holding the terminals of the conductor a fixed distance apart, means for electrically connecting or disconnecting the conductor terminals, and grounded means insulated from the above connecting means arranged to connect or disconnect one of the terminals with ground.

17. A trolley device comprising an interrupted conductor, insulating means for holding the terminals of the conductor a fixed distance apart, rotatably mounted means for electrically connecting or disconnecting the conductor terminals, and rotatably mounted means to connect or disconnect one of the conductors with ground, the last two means having their axes of rotation coinciding.

18. A trolley device comprising an insulating member, spaced means secured to the ends of the insulating member to receive the terminals of adjacent trolley sections and maintain them a fixed distance apart, means to electrically connect or disconnect one of the sections from the ground, means to electrically connect or disconnect the trolley sections and means to lock the switches in one position.

19. A trolley device comprising an interrupted conductor, insulating means for holding the terminals of the conductor a fixed distance apart, means for electrically connecting or disconnecting the conductor terminals, means to ground one conductor terminal when the conductor terminals are disconnected and means to lock the grounding means in engagement with one of the conductor terminals.

In testimony whereof I affix my signature.

SAMUEL S. MATTHES.